US010814388B2

(12) United States Patent
Barnhart et al.

(10) Patent No.: US 10,814,388 B2
(45) Date of Patent: Oct. 27, 2020

(54) HEATED GAS CIRCULATION SYSTEM FOR AN ADDITIVE MANUFACTURING MACHINE

(71) Applicant: General Electric Company, Schenectady, NY (US)

(72) Inventors: David Richard Barnhart, Jefferson, OH (US); Mark Richard Shaw, Mason, OH (US)

(73) Assignee: General Electric Company, Schenectady, NY (US)

(*) Notice: Subject to any disclaimer, the term of this patent is extended or adjusted under 35 U.S.C. 154(b) by 24 days.

(21) Appl. No.: 15/878,569

(22) Filed: Jan. 24, 2018

(65) Prior Publication Data

US 2019/0224748 A1   Jul. 25, 2019

(51) Int. Cl.
*B22F 3/10* (2006.01)
*B33Y 30/00* (2015.01)
*B22F 3/105* (2006.01)

(52) U.S. Cl.
CPC .......... *B22F 3/1007* (2013.01); *B22F 3/1055* (2013.01); *B33Y 30/00* (2014.12); *B22F 2003/1056* (2013.01)

(58) Field of Classification Search
None
See application file for complete search history.

(56) References Cited

U.S. PATENT DOCUMENTS

| 311,391 A | 1/1885 | Vantassel |
| 4,818,562 A | 4/1989 | Arcella et al. |
| 5,287,435 A | 2/1994 | Cohen et al. |
| 5,647,931 A | 7/1997 | Retallick et al. |
| 5,805,971 A | 9/1998 | Akedo |
| 6,084,196 A | 7/2000 | Flowers et al. |
| 6,492,651 B2 | 12/2002 | Kerekes |
| 6,621,039 B2 | 9/2003 | Wang et al. |
| 6,989,115 B2 | 1/2006 | Russell et al. |

(Continued)

FOREIGN PATENT DOCUMENTS

| CN | 103341625 A | 10/2013 |
| CN | 103341625 B | 5/2015 |

(Continued)

OTHER PUBLICATIONS

United States Office Action Corresponding to U.S. Appl. No. 15/878,584 dated Nov. 14, 2019.

*Primary Examiner* — Peter L Vajda
*Assistant Examiner* — Adrianna N Konves
(74) *Attorney, Agent, or Firm* — Dority & Manning, P.A.

(57) ABSTRACT

An additive manufacturing machine includes a heated gas circulation system for regulating the temperature of additive powder throughout an annular powder bed and parts formed therein. The additive manufacturing machine includes an annular build platform defining a plurality of perforations and a heated gas supply that provides a flow of heated air through the plurality of perforations and the powder bed. The additive manufacturing machine further includes a plurality of fairings for guiding the flow of heated gas to temperature sensitive regions to minimize temperature gradients within the powder bed which might otherwise result in distortion, thermal stresses, or cracking in the finished part.

18 Claims, 4 Drawing Sheets

(56) References Cited

U.S. PATENT DOCUMENTS

| | | |
|---|---|---|
| 8,172,562 B2 | 5/2012 | Mattes |
| 8,373,092 B2 | 2/2013 | Dietrich |
| 8,666,142 B2 | 3/2014 | Shkolnik et al. |
| 8,753,105 B2 | 6/2014 | Scott |
| 9,027,378 B2 * | 5/2015 | Crump .................. B22F 3/1055 72/253.1 |
| 9,168,697 B2 | 10/2015 | Crump et al. |
| 9,580,551 B2 | 2/2017 | Vanelli et al. |
| 9,592,660 B2 | 3/2017 | Reese et al. |
| 9,656,427 B2 | 5/2017 | Griszbacher |
| 9,682,424 B2 | 6/2017 | Mironets et al. |
| 9,688,026 B2 | 6/2017 | Ho et al. |
| 9,744,723 B2 | 8/2017 | Baumann et al. |
| 10,005,240 B2 | 6/2018 | Chen et al. |
| 2002/0079601 A1 | 6/2002 | Russell et al. |
| 2008/0268143 A1 | 10/2008 | Vahlas et al. |
| 2010/0044547 A1 | 2/2010 | Higashi et al. |
| 2013/0049247 A1 | 2/2013 | Boivin et al. |
| 2015/0125333 A1 | 5/2015 | Bruck et al. |
| 2016/0193695 A1 * | 7/2016 | Haynes .............. B23K 26/0604 219/76.12 |
| 2016/0200053 A1 * | 7/2016 | Chen ....................... B29C 64/35 425/217 |
| 2017/0050386 A1 * | 2/2017 | Houben ................. B33Y 30/00 |
| 2017/0081752 A1 | 3/2017 | Hanley |
| 2017/0190112 A1 * | 7/2017 | Thorson ................ B33Y 30/00 |
| 2017/0266759 A1 | 9/2017 | Fieret et al. |
| 2017/0313050 A1 | 11/2017 | DeFelice et al. |
| 2018/0001553 A1 * | 1/2018 | Buller ................... B33Y 50/02 |
| 2018/0043614 A1 | 2/2018 | Greenfield et al. |
| 2018/0043632 A1 | 2/2018 | Schuller et al. |
| 2018/0126460 A1 * | 5/2018 | Murphree .............. B29C 64/35 |

FOREIGN PATENT DOCUMENTS

| | | |
|---|---|---|
| CN | 105880591 A | 8/2016 |
| CN | 206286554 U | 6/2017 |

* cited by examiner

HEATED GAS CIRCULATION SYSTEM FOR AN ADDITIVE MANUFACTURING MACHINE

FIELD

The present disclosure generally relates to thermal regulation within an additive manufacturing machine, or more particularly, to a heated gas circulation system for regulating the temperature of a powder bed within an additive manufacturing machine.

BACKGROUND

Additive manufacturing (AM) processes generally involve the buildup of one or more materials to make a net or near net shape (NNS) object, in contrast to subtractive manufacturing methods. Though "additive manufacturing" is an industry standard term (ISO/ASTM52900), AM encompasses various manufacturing and prototyping techniques known under a variety of names, including freeform fabrication, 3D printing, rapid prototyping/tooling, etc. AM techniques are capable of fabricating complex components from a wide variety of materials. Generally, a freestanding object can be fabricated from a computer aided design (CAD) model.

A particular type of AM process uses an energy source such as an irradiation emission directing device that directs an energy beam, for example, an electron beam or a laser beam, to sinter or melt a powder material, creating a solid three-dimensional object in which particles of the powder material are bonded together. AM processes may use different material systems or additive powders, such as engineering plastics, thermoplastic elastomers, metals, and ceramics. Laser sintering or melting is a notable AM process for rapid fabrication of functional prototypes and tools. Applications include direct manufacturing of complex workpieces, patterns for investment casting, metal molds for injection molding and die casting, and molds and cores for sand casting. Fabrication of prototype objects to enhance communication and testing of concepts during the design cycle are other common usages of AM processes.

Selective laser sintering, direct laser sintering, selective laser melting, and direct laser melting are common industry terms used to refer to producing three-dimensional (3D) objects by using a laser beam to sinter or melt a fine powder. More accurately, sintering entails fusing (agglomerating) particles of a powder at a temperature below the melting point of the powder material, whereas melting entails fully melting particles of a powder to form a solid homogeneous mass. The physical processes associated with laser sintering or laser melting include heat transfer to a powder material and then either sintering or melting the powder material. Although the laser sintering and melting processes can be applied to a broad range of powder materials, the scientific and technical aspects of the production route, for example, sintering or melting rate and the effects of processing parameters on the microstructural evolution during the layer manufacturing process have not been well understood. This method of fabrication is accompanied by multiple modes of heat, mass and momentum transfer, and chemical reactions that make the process very complex.

During direct metal laser sintering (DMLS) or direct metal laser melting (DMLM), an apparatus builds objects in a layer-by-layer manner by sintering or melting a powder material using an energy beam. The powder to be melted by the energy beam is spread evenly over a powder bed on a build platform, and the energy beam sinters or melts a cross sectional layer of the object being built under control of an irradiation emission directing device. The build platform is lowered and another layer of powder is spread over the powder bed and object being built, followed by successive melting/sintering of the powder. The process is repeated until the part is completely built up from the melted/sintered powder material.

After fabrication of the part is complete, various post-processing procedures may be applied to the part. Post processing procedures include removal of excess powder by, for example, blowing or vacuuming. Other post processing procedures include a stress release process. Additionally, thermal and chemical post processing procedures can be used to finish the part.

Notably, thermal gradients within a powder bed during an additive manufacturing process can cause uneven growth of manufactured parts. More specifically, conventional DMLM machines use an energy source to melt a top layer of additive powder, but add no other heat within the build enclosure or powder bed. This drives a strong thermal gradient throughout the powder bed, with top layers being much hotter than the cooler lower layers. As a result, these parts often grow and deform in non-uniform ways, resulting in parts that fail to meet dimensional tolerances. In addition, such non-uniform growth can cause cracking or structural failure of the component that are frequently not repairable during post-processing procedures.

Accordingly, an additive manufacturing machine with improved features for regulating thermal gradients throughout the machine would be useful. More particularly, an additive manufacturing machine that reduces thermally induced stresses and deformation in formed components would be particularly beneficial.

BRIEF DESCRIPTION

Aspects and advantages will be set forth in part in the following description, or may be obvious from the description, or may be learned through practice of the invention.

According to one embodiment of the present subject matter, an additive manufacturing machine defining a vertical direction is provided. The additive manufacturing machine includes a turntable rotatable about a central axis and defining a radial direction perpendicular to the central axis. An annular powder bed assembly is operably coupled to the turntable, the powder bed assembly including an annular build platform defining a plurality of perforations. A heated gas supply is in fluid communication with the plurality of perforations for providing a flow of heated gas through the plurality of perforations.

According to another exemplary embodiment, an annular powder bed assembly for an additive manufacturing machine is provided. The annular powder bed assembly includes an annular base plate rotatably fixed to a turntable by a positioning assembly. An annular build platform defines a plurality of perforations in fluid communication with a heated gas supply for receiving a flow of heated gas through the plurality of perforations. A lift mechanism operably couples the build platform to the base plate, the lift mechanism configured for moving the build platform along a vertical direction relative to the base plate.

According to still another exemplary embodiment, an additive manufacturing machine defining a vertical direction is provided. The additive manufacturing machine includes a turntable rotatable about a central axis and defining a radial direction perpendicular to the central axis. An annular powder bed assembly is operably coupled to the turntable, the powder bed assembly including an annular build platform. A positioning assembly operably couples the powder bed assembly to the turntable such that the powder bed assembly is rotatably fixed to the turntable but is movable along the radial direction relative to the turntable.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
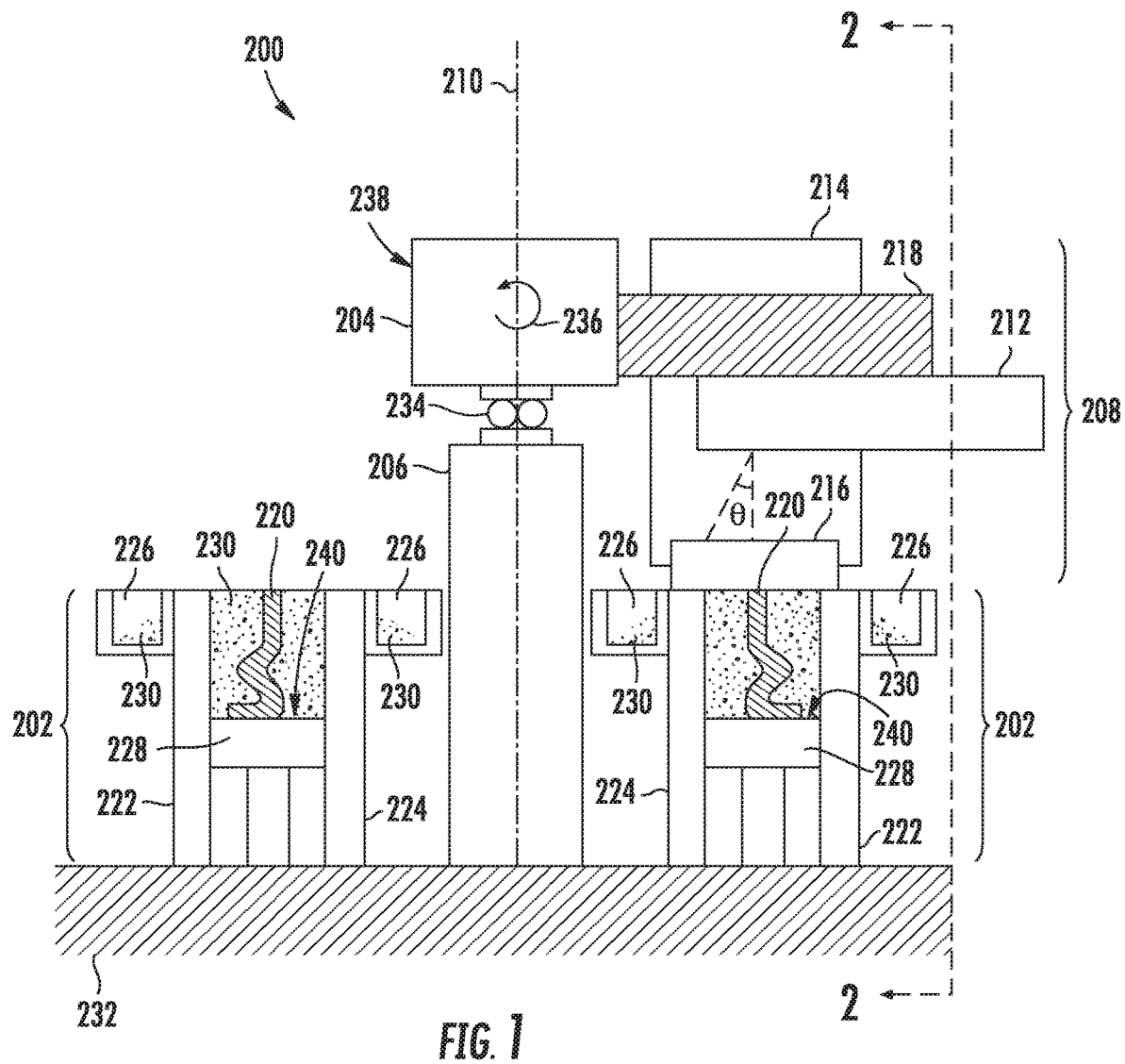
FIG. 1 shows a schematic view of an additive manufacturing machine including a stationary annular powder bed and a rotating build unit according to an exemplary embodiment of the present subject matter.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components. In addition, as used herein, terms of approximation, such as "approximately," "substantially," or "about," refer to being within a ten percent margin of error.

An additive manufacturing machine is generally provided which includes a heated gas circulation system for regulating the temperature of additive powder throughout an annular powder bed and parts formed therein. The additive manufacturing machine includes an annular build platform defining a plurality of perforations and a heated gas supply that provides a flow of heated air through the plurality of perforations and the powder bed. The additive manufacturing machine further includes a plurality of fairings for guiding the flow of heated gas to temperature sensitive regions to minimize temperature gradients within the powder bed which might otherwise result in distortion, thermal stresses, or cracking in the finished part.

The present subject matter provides a large-scale additive manufacturing apparatus and embodiments of the apparatus that can be used to perform powder bed based additive manufacturing, including but not limited to selective laser sintering (SLS), selective laser melting (SLM), direct metal laser sintering (DMLS), direct metal laser melting (DMLM) and electron beam melting (EBM) processes. The apparatus is particularly useful for making large objects that are substantially annular or cylindrical in a continuous manner where the powder deposition, powder leveling, and beam irradiation can occur simultaneously. As used herein, the term "continuous" means that a process or a specific step of a process or a movement (e.g. powder deposition, powder leveling, or beam irradiation) is uninterrupted in time and has no interstices or intervals of time. As used herein, the term "simultaneous" means that two or more processes or specific steps of a process (powder deposition, powder leveling, or beam irradiation) are taking place concurrently or coincidentally in time. Examples of these substantially annular or cylindrical objects are annular or cylindrical components of an aircraft engine or an aircraft. Examples of such aircraft components are turbine or vane shroudings, central engine shaft, casings, compressor liners, combustor liners, ducts, etc. In some instances, these components can have a radius of up to 2 meters or larger. Additionally, multiple smaller objects can be arranged appropriately on the build platform to be simultaneously built.

Accordingly, an additive manufacturing apparatus of the present subject matter includes an annular powder bed instead of a conventional rectangular powder bed. Certain exemplary embodiments include a rotating build unit that passes over a rotatably fixed annular powder bed, while other embodiments includes a rotating powder bed and a fixed build unit positioned over the powder bed. An exemplary build unit includes a powder delivery mechanism, a powder recoating mechanism, and an energy source such as an irradiation beam directing mechanism. Whether the powder bed, build unit, or both the powder bed and the build unit are rotating, the build unit is preferably concentric with the powder bed being positioned above the powder bed at a position suitable for simultaneously leveling powder and melting powder to form a fused layer of the build object at one or more build areas within the powder bed.

As used herein, the term "mechanism" refers to a structural entity that is either single device or instrument, a single device or instrument having multiple components, or a system of multiple, distinct devices or instruments. The term "mechanism" is used interchangeably with the term "unit", which bears the same definition as set forth in the foregoing sentence.

FIG. 1 is a schematic front cross-sectional view of a large-scale additive manufacturing apparatus 200 in accordance with an embodiment of the present subject matter. The apparatus 200 includes an annular powder bed 202 and a build unit 208. The annular powder bed 202 has a build platform 228, a circular inner wall 224 and a circular outer wall 222 with a diameter that is greater than the diameter of the inner wall 224. At the beginning of a powder-based additive manufacturing process, the raw material powder is deposited onto the build surface 240 which is the top surface of the build platform 228. In some embodiments, such as the embodiment shown in FIG. 1, the inner and outer walls 224, 222 of the annular powder bed 202 each include a receptacle 226 to capture unfused powder spillover during production. The apparatus 200 further includes a build unit 208 which has several components each serving different functions in a powder-based additive manufacturing process such as but not limited to selective laser melting (SLM), direct metal laser melting (DMLM) and electron beam melting (EBM). Among the components of the build unit 208 are, for example, a powder delivery mechanism 214 (e.g. a hopper), an irradiation beam directing mechanism 212, and a recoating mechanism 216. The recoating mechanism 216 may be a scraper, blade, squeegee, roller, or the like.

Figure 3:
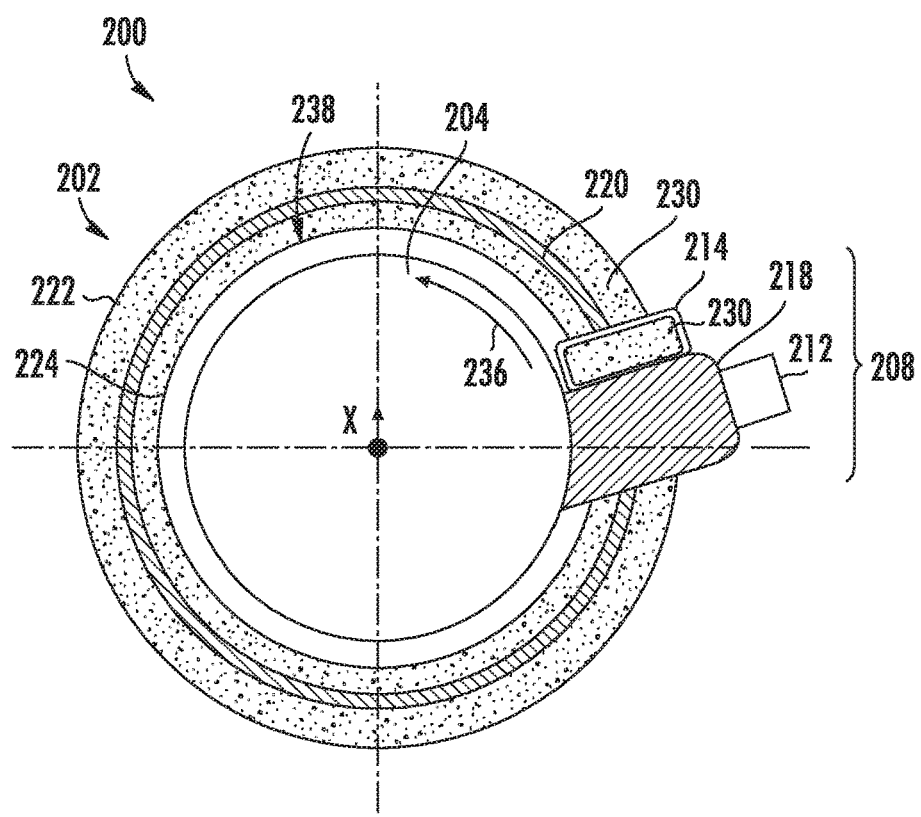
FIG. 3 is a schematic top view of the exemplary additive manufacturing machine of FIG. 1.

During an additive manufacturing process, the powder delivery mechanism 214 directionally delivers and deposits a raw material powder 230 onto and/or into the powder bed 202. The powder recoating mechanism 216 directionally spreads and levels the deposited powder 230 into a substantially even powder layer, and a portion of this substantially even powder layer (i.e. a build area) is then melted by the laser or electron beam emitted by the irradiation beam directing mechanism 212 to form a fused, additive layer of the built object 220. This irradiation beam is indicated with a dashed line throughout the accompanying figures. This manufacturing cycle repeats itself, which results in multiple layers being stacked to form the growing built object 220. Although FIG. 3 shows a single built object 220, it should be appreciated that the large-scale additive manufacturing apparatus 200 may be used to additively and simultaneously manufacture multiple smaller objects in the annular powder bed 202.

Representative examples of suitable materials for a raw material powder used during an additive manufacturing process of the present subject matter include alloys that have been engineered to have good oxidation resistance, known "superalloys" which have acceptable strength at the elevated temperatures of operation in a gas turbine engine, e.g. Hastelloy, Inconel alloys (e.g., IN 738, IN 792, IN 939), Rene alloys (e.g., Rene N4, Rene N5, Rene 80, Rene 142, Rene 195), Haynes alloys, Mar M, CM 247, CM 247 LC, C263, 718, X-750, ECY 768, 282, X45, PWA 1483 and CMSX (e.g. CMSX-4) single crystal alloys. The manufactured objects of the present invention may be formed with one or more selected crystalline microstructures, such as directionally solidified ("DS") or single-crystal ("SX").

Notably, in accordance with the present subject matter, all three integral steps of powder deposition, powder leveling, and powder melting may happen concurrently and continuously. Preferably, these three steps of the powder-based additive manufacturing process take place concurrently and continuously at multiple build areas. For example, at a given point in time, the powder delivery mechanism 214 deposits the powder 230 at a region or build area in the powder bed 202; the powder recoating mechanism 216 levels the powder 230 into a substantially even powder layer at a region or build area where the powder delivery mechanism 214 previously deposited the powder 230; and the irradiation beam directing mechanism 212 melts a selective area within a substantially even powder layer previously leveled by the powder recoating mechanism 216.

The build unit 208 is attached to a rotating mechanism 204 that is operable to rotate the build unit 360° around the rotational axis 210. In accordance with the present subject matter, the rotating mechanism 204 is a rigid structure having a cylindrical configuration, or alternatively an annular or ring or doughnut configuration. In one embodiment, the build unit 208 is directly attached to an area on the circumference 238 of the rotating mechanism 204. In an alternative embodiment, a support arm 218 emanates from the circumference of the rotating mechanism, upon which at least one of the powder delivery mechanism 214, the irradiation beam directing mechanism 212, and the recoating mechanism 216 is mounted. Alternatively, the build unit 208 is attached to the bottom surface of rotating mechanism 204, or at any other suitable location, either directly or indirectly via a support arm.

Figure 2:
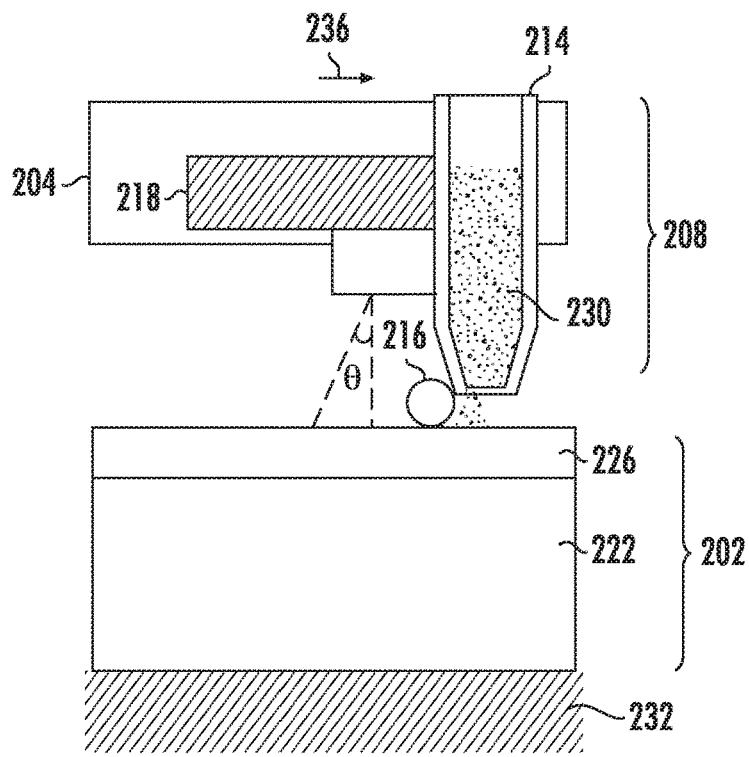
FIG. 2 shows a cross sectional view of the exemplary additive manufacturing machine of FIG. 1, taken along Line 2-2 of FIG. 1.

In FIG. 2, it is shown that the powder delivery mechanism 214 and the irradiation beam directing mechanism 212 are secured to the support arm while the powder recoating mechanism 216 is attached to the powder delivery mechanism 214, specifically at the gate at the bottom portion of the powder delivery mechanism 214 where the powder 230 is dispensed. Since the build unit 208 deposits, levels and melts the powder 230 in this particular order, it may be advantageous to arrange the related three components imparting these functions such that, in relation to the rotational direction indicated by the arrow 236 of the rotating mechanism 204, the powder delivery mechanism 214 precedes the powder recoating mechanism 216, which is then followed by the irradiation beam directing mechanism 212, which may direct a beam of energy at an incidence angle θ measured relative to the vertical direction.

While the build unit 208 is attached to the rotating mechanism 204, the rotating mechanism 204 in turn may be attached and supported onto a tower 206, for example, via a connector 234. In this embodiment, the connector is shown as a ball bearing that is sandwiched between an upper race and a lower race. It would be readily appreciated by one having skill in the art that any other types of suitable connectors may be used. The tower 206 is a vertically elongated and erect structure, which as shown in FIG. 1, oversees the annular powder bed 202. Preferably, also as shown in FIG. 1, the tower 206, the rotating mechanism 204 and the annular powder bed are concentric, where the common center is point X as indicated in FIG. 3. Preferably, for any given tower and rotating mechanism, annular powder beds of different sizes can be arranged concentrically around them. In other words, the diameter of the powder bed is typically greater than the diameter of the rotating mechanism and the width or diameter of the tower, although it does not have to be so restricted.

An irradiation beam directing mechanism used in the present invention may be an optical control unit for directing an irradiation beam such as a laser beam. The optical control unit may comprise one or more optical lenses (including telecentric lenses), deflectors, mirrors, and/or beam splitters. Alternatively, the irradiation beam directing mechanism may be an electronic control unit for directing an electron beam. The electronic control unit may comprise one or more deflector coils, focusing coils, and/or similar elements. In certain embodiments, the irradiation beam directing mechanism is composed of a diode fiber laser array (e.g. a diode laser bar or stack) that includes a plurality of diode lasers or emitters that each emit a beam of radiation. A cylindrical lens may be positioned between the diode lasers and a plurality of optical fibers. The cylindrical lens compensates for the high angular divergence in the direction perpendicular to the diode junction of the lasers, typically reducing the beam divergence in the fast axis to less than that of the slow axis, thereby easing the assembly tolerances of the overall system compared to an assembly which does not use any coupling optics (i.e., one in which each fiber is simply placed in close proximity to the laser to which it is to be coupled). However, it should be appreciated that diode fiber laser arrays that do not use coupling optics may be used with the present technology. In certain embodiments, the plurality of optical fibers may further include lenses at their respective ends that are configured to provide collimated or divergent laser beams from the optical fibers. It should also be appreciated that even in the absence of these lenses, the ends of the optical fibers may be adapted to provide collimated or divergent laser beams.

In certain embodiments, an irradiation beam directing mechanism in accordance with the present subject matter may also include an irradiation source that, in the case of a laser source, originates the photons comprising the laser irradiation that is directed by the mechanism. When the irradiation source is a laser source, then the irradiation beam directing mechanism may be, e.g. a galvo scanner, and the laser source may be located outside of the build environment. Under these circumstances, the laser irradiation may be transported to the irradiation beam directing mechanism by any suitable means, e.g. a fiber-optic cable. When the irradiation source is an electron source, then the electron source originates the electrons that comprise the electron beam or e-beam that is directed by the irradiation beam directing mechanism. When the irradiation source is an electron source, then the beam directing mechanism may be, e.g. a deflecting coil.

When a large-scale additive manufacturing apparatus in accordance with the present subject matter is in operation, if the irradiation beam directing mechanism directs a laser beam, then generally it is advantageous to include a gas-flow mechanism providing a substantially laminar gas flow in a gas-flow zone. This is because the interaction of the laser beam with the powder media at the melt pool can result in smoke production. The produced smoke can condense on and contaminate the build object or can interfere with the irradiation of the build surface, thereby jeopardizing the fidelity of the object. However, if an electron beam is instead used, it is important to maintain sufficient vacuum in the space through which the electron beam travels, hence a gas-flow mechanism should not be included in the build unit.

In further embodiments, an irradiation beam directing mechanism may include one or more electrical slip rings and/or telemetry for improved control of the movements of the mechanism in the rotating environment of a powder-based additive manufacturing process of the present invention.

In certain embodiments, the annular powder bed 202 and the central tower 206 may be additionally mounted on a stationary support structure 232. In a preferred embodiment, the apparatus 200 is encased within a build chamber and the atmosphere environment within the chamber, i.e. the "build environment", or "containment zone", is typically controlled such that the oxygen content is reduced relative to typical ambient air, and such that the environment is at a reduced pressure. In some embodiments, the build environment defines an inert atmosphere (e.g., an argon atmosphere). In further embodiments, the build environment defines a reducing atmosphere to minimize oxidation. In yet further embodiments, the build environment defines a vacuum.

As the powder-based additive manufacturing progresses and the additively built object grows, the build platform 228 may be lowered and raised accordingly. Accordingly, moving of the build platform upward or downward, deposition of powder, leveling of powder and beam irradiation occur simultaneously and continuously. Alternatively, the build platform 228 may be vertically stationary but the tower 206 may be configured to be vertically movable, e.g. move upward and downward as the manufacturing process progresses. Accordingly, moving of the tower upward or downward, deposition of powder, leveling of powder and beam irradiation occur simultaneously and continuously.

In certain embodiments, a build unit having a laser beam irradiation mechanism may advantageously include a gas-flow mechanism with gas inlet(s) and outlet(s) providing a substantially laminar gas flow in a gas-flow zone to a build area on the powder bed. This is because the interaction of the laser beam with the powder media at the melt pool can result in smoke production. The produced smoke can condense on and contaminate the build object or can interfere with the irradiation of the build surface, thereby jeopardizing the fidelity of the object. However, if an electron beam is instead used, it is important to maintain sufficient vacuum in the space through which the electron beam travels, hence a gas-flow mechanism should not be included in the build unit.

Although a single build unit 208 is illustrated in FIG. 3, it should be appreciated that more than one build unit may be used according to alternative embodiments. In this regard, for example, multiple build units 208 may be attached to central rotating mechanism 204 via supporting arms 218, which may then be attached and supported onto a central tower 206 and spaced apart along the circumferential direction. Each build unit 208 has a powder delivery mechanism, a powder recoating mechanism, and an irradiation beam directing mechanism. Each build unit 208 is operable to additively manufacture a portion of the built object 220 in the annular powder bed 202 that is defined by an inner wall 224 and an outer wall 222.

Notably, thermal gradients within a powder bed during an additive manufacturing process can cause uneven growth of manufactured parts. More specifically, conventional DMLM machines use a laser, electron beam, or other energy source to sinter or melt a top layer of additive powder, but add no other heat within the build enclosure or powder bed. This process drives a strong thermal gradient throughout the powder bed, the manufactured part, and within the build chamber. As a result of the non-uniform thermal loading within the build chamber, high induced stresses may be introduced into manufactured parts. In addition, these parts often grow and deform in non-uniform ways, resulting in parts that fail to meet dimensional tolerances and cause inconsistent build processes due to the significant dimensional changes resulting from the temperature variations. In addition, such non-uniform growth can cause cracking or structural failure of the component that are frequently not repairable during post-processing procedures. Aspects of the present subject matter address these thermal, dimensional, and alignment issues by reducing thermal gradients and making thermally driven dimensional changes more predictable and manageable, e.g., by thermally stabilizing the build process and related elements.

Referring now to FIGS. 4 through 7, an additive manufacturing machine 300 will be described according to an exemplary embodiment of the present subject matter. As shown, additive manufacturing machine 300 generally defines a vertical direction V which corresponds to a build direction of additively manufactured component 302. Although additive manufacturing machine 300 is used herein as an exemplary machine for forming component 302, it should be appreciated that aspects of the present subject matter may be used in other additive manufacturing machines used for forming other components. In addition, it should be appreciated that aspects of additive manufacturing machine 300 may be similar to apparatus 200, and components or features of each of these machines may be interchangeable according to exemplary embodiments. Although not illustrated, machine 300 may include an enclosure which generally defines a build area, the enclosure being insulated to retain heat within the build area.

According to the illustrated embodiment, machine 300 includes a turntable 304 which is rotatable about a central axis 306. More specifically, central axis 306 is parallel to the vertical direction V such that turntable 304 defines a radial direction R that is perpendicular to central axis 306 and extends within a horizontal plane H. Notably, apparatus 200, as described above, has a rotatably fixed powder bed 202 and one or more build units 208 with rotate about that powder bed 202. By contrast, machine 300, as described with respect to FIGS. 4 through 7, has a powder bed that is rotatably coupled to turntable 304 and a build unit 308 that is positioned above the rotating powder bed along the vertical direction V.

Similar to build unit 208 described above, build unit 308 is generally used for depositing a layer of additive powder and fusing portions of the layer of additive powder to form a single layer of a component. More specifically, build unit 308 generally includes a powder dispenser (not shown in FIG. 4) for discharging a layer of additive powder and an energy source (not shown in FIG. 4) for selectively directing energy toward the layer of additive powder to fuse portions of the layer of additive powder. As used herein, "energy source" may be used to refer to any device or system of devices configured for directing an energy beam towards a layer of additive powder to fuse a portion of that layer of additive powder. For example, according to an exemplary embodiment, energy source may be an irradiation emission directing device and many include one or more lenses for directing an energy beam. Thus, build unit 308 forms the component layer-by-layer by printing or fusing layers of additive powder as the powder bed moves down along the vertical direction V.

Figure 4:
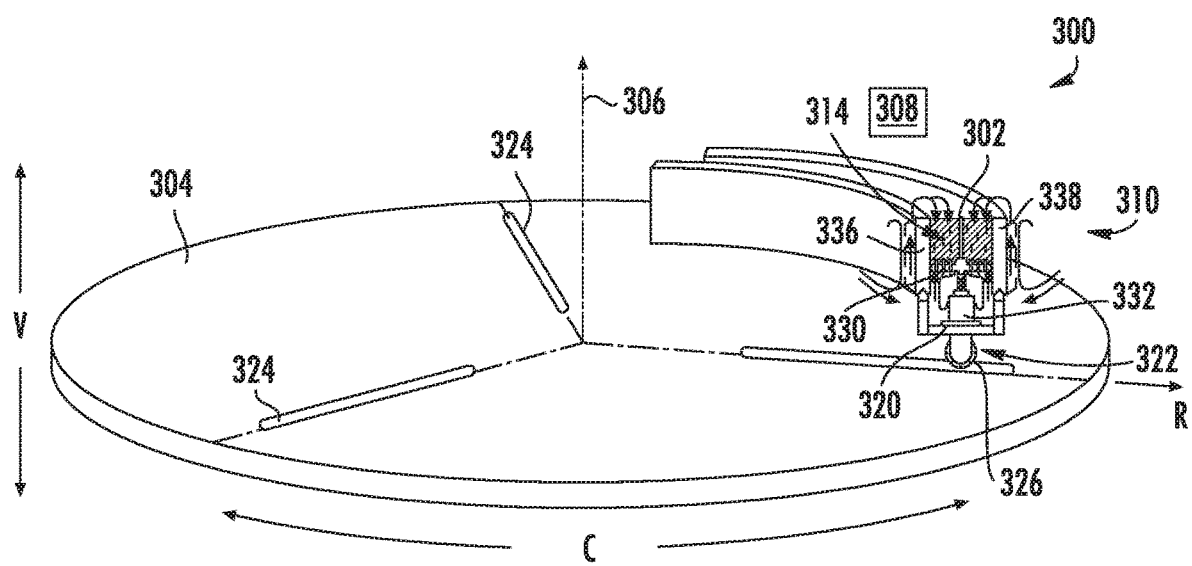
FIG. 4 provides a partial perspective view of an additive manufacturing machine including a rotating annular powder bed according to an exemplary embodiment of the present subject matter.
Figure 5:
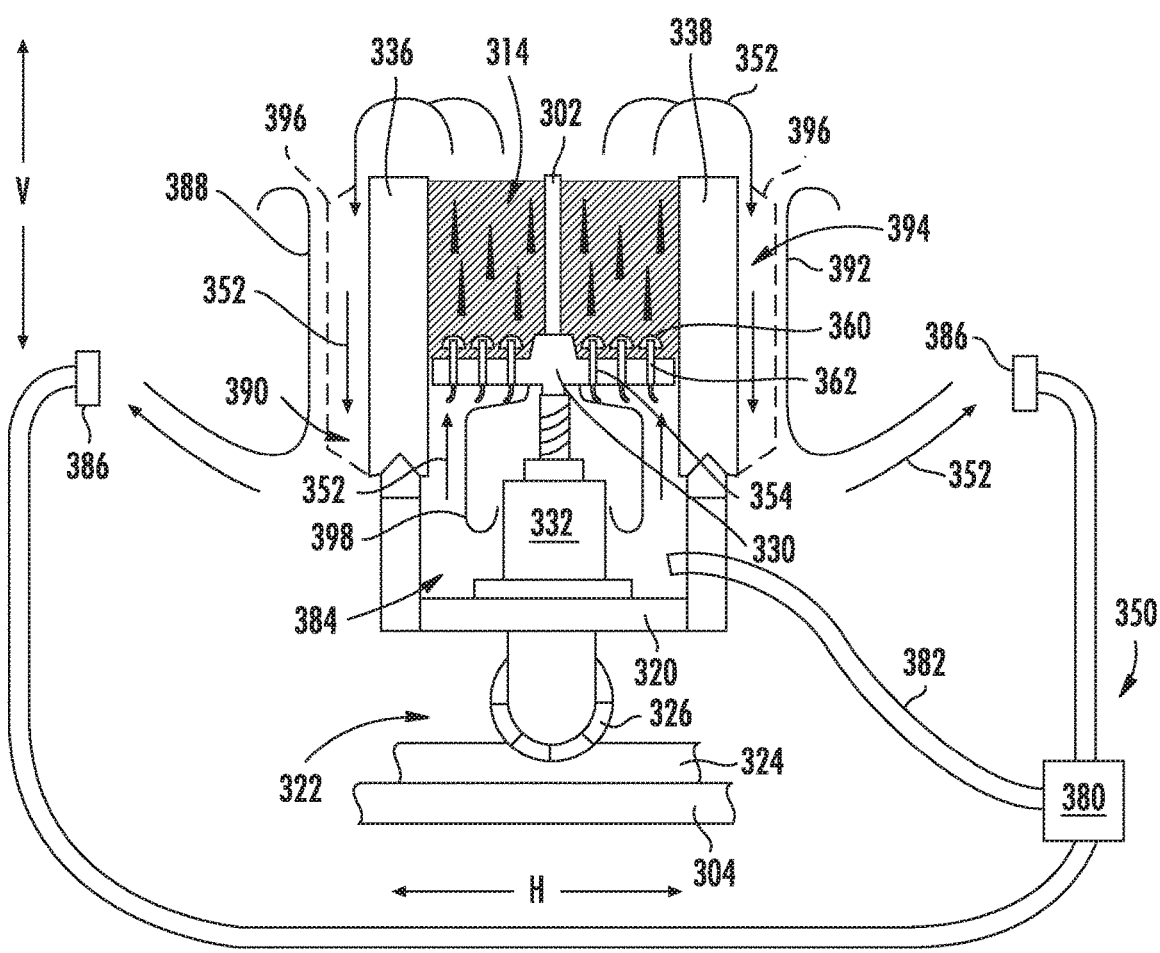
FIG. 5 provides a schematic view of a heated gas circulation assembly operably coupled with the rotating annular powder bed of the exemplary additive manufacturing machine of FIG. 4 according to an exemplary embodiment of the present subject matter.
Figure 6:
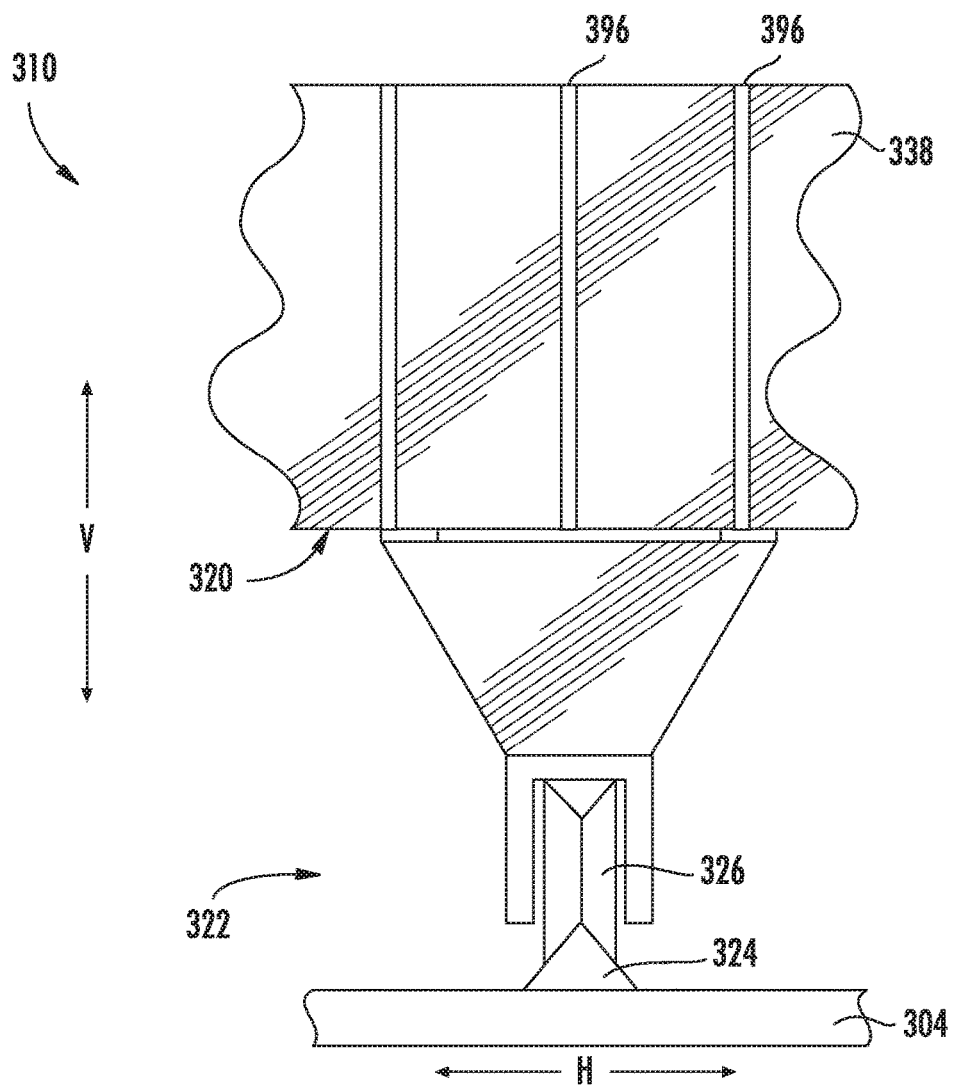
FIG. 6 illustrates an alignment or positioning assembly for maintaining the alignment of the annular powder bed according to an exemplary embodiment of the present subject matter.

Referring now to FIGS. 4 through 6, machine 300 includes an annular powder bed assembly 310 that is operably coupled to turntable 304. Notably, FIG. 4 only illustrates a portion of annular powder bed assembly 310 to prevent obscuring turntable 304. FIG. 5 is a close up cross-sectional view of annular powder bed assembly 310. In general, annular powder bed assembly 310 extends around central axis 306 and is configured for supporting additive powder 312, e.g., within a powder bed 314, that is deposited and fused by build unit 308. Annular powder bed assembly 310 is described below according to an exemplary embodiment.

Referring specifically to FIGS. 5 and 6, annular powder bed assembly 310 includes an annular base plate 320 that is rotatably fixed to turntable 304 by positioning assembly 322. In this regard, positioning assembly 322 includes one or more alignment ways 324 that extend upward along the vertical direction V from turntable 304 and extend substantially along the radial direction R. In addition, positioning assembly 322 includes one or more grooved wheels 326 that are mounted to base plate 320 and are configured for engaging the alignment ways 324 such that wheels 326 may roll along the radial direction R but fix base plate 320 (and thus annular powder bed assembly 310) along the circumferential direction C relative to turntable 304. In this manner, annular powder bed assembly 310 is rotationally coupled with turntable 304. Such coupling permits large radial growth of thermally driven elements while maintaining their centerlines in relative alignment with non-thermal elements of machine 300 that need to maintain a predictable dimensional relationship relative to one another.

Notably, positioning assembly 322 enables AM machine to accommodate significant changes in radial dimension of the annular powder bed as it assumes various thermal states undergoing corresponding degrees of thermal growth while maintaining concentricity with turntable 304. Even though thermally driven variation in the radial dimension of a given annular powder bed assembly 310 is small relative to the length of the alignment ways 324 shown in FIG. 4, the extended length of the ways provides a convenient means for configuring a versatile machine system that can build any annular diameter component just by interchanging inner wall 336 and outer wall 338 with walls having a different set of diameters. Such configurations would engage the alignment ways 324 at different radial positions along their full extent.

Referring again to FIG. 5, powder bed assembly 310 includes an annular build platform 330 that is mounted to base plate 320 by a lift mechanism 332. In this manner, lift mechanism 332 is generally configured for moving build platform 330 along a vertical direction V relative to turntable 304 and base plate 320. Thus, lift mechanism 332 is generally configured for moving the build platform 330 in a manner similar to build platform 228 to support the additive manufacturing process, e.g., by lowering powder bed 314 incrementally as each layer is printed. Lift mechanism 332 may be any suitable device or mechanism that vertically supports and moves build platform 330, such as a hydraulic lift or any other suitable vertical support means.

In addition, powder bed assembly 310 may further include an annular inner wall 336 and an annular outer wall 338 positioned on radially opposite sides of build platform 330. In this manner, build platform 330, inner wall 336, and outer wall 338 generally define powder bed 314. Notably, according to an exemplary embodiment, inner wall 336 and outer wall 338 have a fixed height relative to base plate 320. However, it should be appreciated that other configurations are possible and within scope of the present subject matter.

According to an exemplary embodiment of the present subject matter, machine 300 includes a heated gas circulation system 350 which is generally configured for providing a flow of heated gas (as indicated by arrows 352) throughout the build area and/or powder bed 314 to reduce thermal gradients within machine 300. As described below according to an exemplary embodiment, machine 300 includes a variety of features for facilitating the flow of heated gas 352 throughout temperature sensitive regions within machine 300. However, it should be appreciated that the configuration described below is only exemplary and is not intended to limit the scope of the present subject matter.

According to the exemplary embodiment illustrated in FIG. 5, build platform 330 defines a plurality of perforations 354 which generally extend through build platform 330 to receive the flow of heated gas 352. For example, according to the illustrated embodiment, perforations 354 extend substantially along the vertical direction V from a bottom 356 of build platform 330 to a top 358 of build platform 330. According to the illustrated embodiment, perforations 354 are spaced equidistant relative to each other and are positioned throughout annular build platform 330. As an example, each perforation 354 is substantially cylindrical and is sized to prevent excessive flow of additive powder 312 through build platform 330 while permitting the flow of heated gas 352 therethrough. However, it should be appreciated that according to alternative embodiments, perforations 354 may have any suitable size, shape, and orientation relative to the build platform 330, e.g., to facilitate the flow heated gas 352.

As shown in FIG. 5, annular powder bed assembly 310 may include additional features to prevent additive powder 312 from continuously falling through perforations 354. In this regard, for example, a plurality of mushroom-shaped covers 360 may be positioned above perforations 354 and be generally configured for restricting the flow of additive powder 312 through perforations 354. According to an exemplary embodiment, each perforation 354 may further be in fluid communication with an extension tube 362 which extends upward along the vertical direction V and opens under mushroom cover 360 to prevent all or some of additive powder 312 from falling through extension tube 362 and perforation 354.

Figure 7:
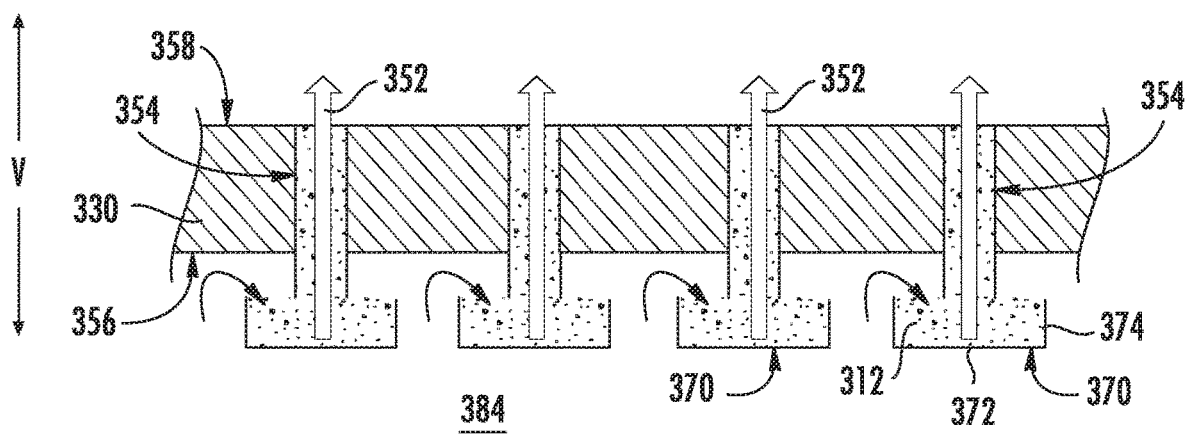
FIG. 7 shows a cross sectional view of a build platform of the exemplary additive manufacturing machine of FIG. 4 according to an exemplary embodiment of the present subject matter.

Referring now specifically to FIG. 7, according to an alternative embodiment, machine 300 may further include a plurality of catch trays 370 which are generally configured to restrict the flow of additive powder 312 through perforations 354. More specifically, a single catch tray 370 may be positioned below each of the plurality of perforations 354. Each catch tray 370 may include a bottom wall 372 positioned below the corresponding perforation 354 along the vertical direction V, and may also include a raised wall 374 that extends around a perimeter of bottom wall 372 and along the vertical direction V to prevent additive powder 312 from piling up and falling over the edges of bottom wall 372 and out of catch tray 370. In this manner, catch trays 370 are generally configured for permitting a certain amount of additive powder 312 to pass through perforation 354 and collect on bottom wall 372 until the flow is sufficiently restricted to prevent further additive powder 312 from flowing.

Notably, catch trays 370 are spaced apart from bottom 356 of build platform 330 in order to permit the flow of heated gas 352 to pass over raised wall 374 and through the collected additive powder 312 and perforations 354 into powder bed 314. In addition, catch trays 370 are only one method of restricting the flow of additive powder 312 through perforations 354 without restricting the flow of heated gas 352. Other embodiments may use alternative methods of restricting or containing additive powder 312, such as filter screens, one-way valves, very small apertures that permit only the flow of heated gas 352, etc.

Referring generally to FIGS. 4 and 5, heated gas circulation system 350 will be described according to an exemplary embodiment. In general, heated gas circulation system 350 includes a heated gas supply 380 that is generally configured for providing the flow of heated gas 352. For example, according to an exemplary embodiment, heated gas supply 380 is a hot inert gas generator that generates hot gas for use in reducing thermal gradients throughout machine 300. In addition, the operation of heated gas supply 380 may be supported by a circulation pump according to alternative embodiments.

As illustrated, heated gas supply 380 is in fluid communication with perforations 354 for providing the flow of heated gas 352 through perforations 354. More specifically, machine 300 includes an inlet conduit 382 that may be in fluid communication with a distribution plenum 384 positioned below build platform 330. More specifically, distribution plenum 384 may be an annular plenum defined between base plate 320 and build platform 330 along the vertical direction V and between inner wall 336 and outer wall 338 along the radial direction R. Heated gas supply 380 may urge the flow of heated gas 352 through inlet conduit 382, into distribution plenum 384, and through perforations 354. In this manner, each perforation 354 may receive a substantially uniform an equivalent flow of heated gas 352 to facilitate even the heating of powder bed 314. It should be appreciated that according to alternative embodiments, heated gas supply 380 may be fluidly coupled to distribution plenum 384 or perforations 354 using any other suitable fluid conduits or manifold systems.

In addition, heated gas circulation system 350 may include one or more hot gas intakes 386 that are positioned within the build area of machine 300 for recirculating the flow of heated gas 352 back through heated gas supply 380. More specifically, according to the illustrated embodiment, hot gas intakes 386 are positioned inward and/or outward from annular powder bed assembly 310 along the radial direction R. In addition, machine 300 may include various walls, fairings, and heat conducting fins for directing the flow of heated gas 352 through and around annular powder bed assembly 310 to maximize heat transfer and ensure even heating of powder bed 314.

For example, machine 300 may include an inner fairing 388 spaced apart from inner wall 336 along the radial direction R to define an inner passageway 390 and an outer fairing 392 spaced apart from outer wall 338 along the radial direction R to define an outer passageway 394. In addition, hot gas intakes 386 may be positioned such that the flow of heated gas 352 is routed down through inner passageway 390 and outer passageway 394, e.g., across inner wall 336 and outer wall 338 to evenly heat these walls. Moreover, inner wall 336 and outer wall 338 may define heat conducting fins 396 that are generally configured for increasing the heat transfer between the flow of heated gas 352 and walls 336, 338. Finally, according to another exemplary embodiment, a plurality of inner distribution fairings 398 may be positioned below build platform 330 along the vertical direction V, e.g., within distribution plenum 384 for directing the flow of heated gas 352 to perforations 354.

According to the illustrated embodiment, heated gas supply 380 urges the flow of heated gas 352 through inlet conduit 382, into distribution plenum 384, through perforations 354, and up through powder bed 314 along the vertical direction V. However, it should be appreciated that according to alternative embodiments, the flow of heated gas 352 may flow in a reverse direction, e.g., down through powder bed 314. According still other embodiments, any suitable heated gas flow path may be defined throughout machine 300 to minimize thermal gradients within the build area and/or powder bed 314. The embodiments described herein only examples used for the purpose of illustration and are not intended to limit the scope of the present subject matter.

The heated gas circulation system described herein includes a heated gas supply for providing a flow of heated gas through a powder bed, around a powder bed assembly, and throughout a build enclosure. As a result, harmful temperature gradients within the additive manufacturing machine are minimized, resulting in improved manufacturing tolerances, reduced stresses, and higher quality finished components.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An additive manufacturing machine defining a vertical direction, the additive manufacturing machine comprising:
   a turntable rotatable about a central axis and defining a radial direction perpendicular to the central axis;
   an annular powder bed assembly operably coupled to the turntable, the powder bed assembly comprising an annular base plate and an annular build platform spaced apart along the vertical direction to define a distribution plenum therebetween, the annular build platform defining a plurality of perforations;
   a lift mechanism positioned between the base plate and the build platform for moving the build platform along the vertical direction relative to the base plate;
   a positioning assembly operably coupling the powder bed assembly to the turntable such that the powder bed assembly is rotatably fixed to the turntable but is movable along the radial direction relative to the turntable; and
   a heated gas supply in fluid communication with the distribution plenum for providing a flow of heated gas through the distribution plenum and the plurality of perforations.

2. The additive manufacturing machine of claim 1, wherein the build platform is surrounded by an annular inner wall and an annular outer wall.

3. The additive manufacturing machine of claim 2, comprising:
   an inner fairing positioned inward and spaced apart from the inner wall along the radial direction to define an inner passageway therebetween; and
   an outer fairing positioned outward and spaced apart from the outer wall along the radial direction to define an outer passageway therebetween, wherein the flow of heated gas is routed through the inner passageway and the outer passageway.

4. The additive manufacturing machine of claim 1, wherein the positioning assembly comprises:
   one or more alignment ways defined by the turntable and extending along the radial direction; and
   one or more grooved wheels mounted to the powder bed assembly for engaging the alignment ways.

5. The additive manufacturing machine of claim 1, wherein the perforations extend substantially along the vertical direction from a bottom of the build platform to a top of the build platform.

6. The additive manufacturing machine of claim 1, comprising:
   a plurality of catch trays positioned below the plurality of perforations, the catch trays configured for restricting the flow of additive powder through the perforations.

7. The additive manufacturing machine of claim 6, wherein each of the catch trays comprises a bottom wall and a raised wall extending around a perimeter of the bottom wall.

8. The additive manufacturing machine of claim 1, wherein the powder bed assembly further comprises:
   a plurality of inner distribution fairings positioned below the build platform along the vertical direction for directing the flow of heated gas to the perforations.

9. The additive manufacturing machine of claim 1, wherein the heated gas supply is part of a recirculation system, the recirculation system comprising:
   one or more hot gas intakes for recirculating the flow of heated gas back through the heated gas supply.

10. The additive manufacturing machine of claim 1, wherein the heated gas supply is a hot inert gas generator.

11. The additive manufacturing machine of claim 1, comprising:
    a build unit positioned above the annular powder bed assembly, the build unit comprising a powder dispenser for depositing layers of additive powder and an energy source for selectively fusing portions of the layers of additive powder.

12. An annular powder bed assembly for an additive manufacturing machine, the annular powder bed assembly comprising:
    an annular base plate rotatably fixed to a turntable by a positioning assembly that operably couples the annular base plate to the turntable such that the annular base plate is rotatably fixed to the turntable but is movable along a radial direction relative to the turntable;
    an annular build platform defining a plurality of perforations;
    an annular inner wall and an annular outer wall surrounding the build platform along the radial direction, wherein the base plate, the build platform, the inner wall, and the outer wall define a distribution plenum in fluid communication with a heated gas supply for receiving a flow of heated gas and distributing the flow of heated gas through the plurality of perforations; and
    a lift mechanism positioned within the distribution plenum and operably coupling the build platform to the base plate, the lift mechanism configured for moving the build platform along a vertical direction relative to the base plate.

13. The powder bed assembly of claim 12, comprising:
    an inner fairing positioned inward and spaced apart from the inner wall along the radial direction to define an inner passageway therebetween; and
    an outer fairing positioned outward and spaced apart from the outer wall along the radial direction to define an outer passageway therebetween, wherein the flow of heated gas is routed through the inner passageway and the outer passageway.

14. The powder bed assembly of claim 12, comprising:
    a plurality of catch trays positioned below the plurality of perforations, the catch trays configured for restricting the flow of additive powder through the perforations.

15. An additive manufacturing machine defining a vertical direction, the additive manufacturing machine comprising:
    a turntable rotatable about a central axis and defining a radial direction perpendicular to the central axis;
    an annular powder bed assembly operably coupled to the turntable, the powder bed assembly comprising an annular base plate and an annular build platform;
    a positioning assembly operably coupling the powder bed assembly to the turntable such that the powder bed assembly is rotatably fixed to the turntable but is movable along the radial direction relative to the turntable; and a lift mechanism positioned between the base plate and the build platform for moving the build platform along the vertical direction relative to the base plate.

16. The additive manufacturing machine of claim 15, wherein the positioning assembly comprises:

one or more alignment ways defined by the turntable and extending along the radial direction; and one or more grooved wheels mounted to the powder bed assembly for engaging the alignment ways.

17. The additive manufacturing machine of claim 6, wherein each of the plurality of catch trays is positioned below one of the plurality of perforations.

18. The powder bed assembly of claim 14, wherein each of the plurality of catch trays is positioned below one of the plurality of perforations.

* * * * *